6200X
B. D. Beecher.
Corn Sheller.
Patented Oct. 20, 1830.
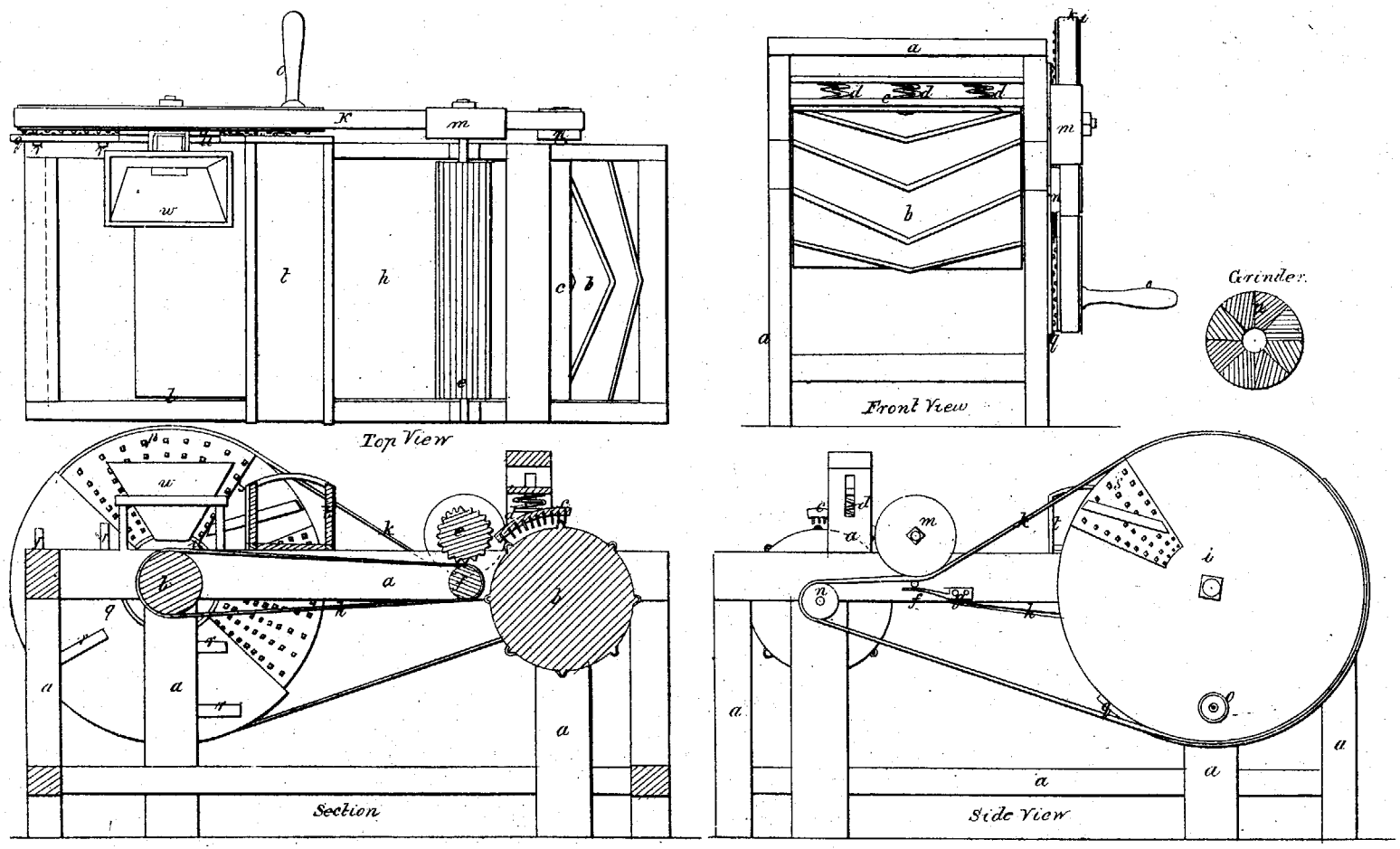
THE NORRIS PETERS CO., WASHINGTON, D. C.

Benjamin D. Beecher
Letters Patent

The Schedule referred to in these Letters Patent and making part of the same containing a description in the words of the said Benjamin D Beecher himself of his improvement in a combination of machinery for threshing Grain, Shelling Corn, cutting Straw and Grinding provender.

This combination of machinery consists of a frame made of timber of the size of 4 inches square, 6 feet in length or more 3 feet wide & the same in height - 2nd A cylinder is made of wood about sixteen inches in diameter: thirty inches in length. upon which are six, eight or ten projections, of about three fourths of an inch, faced with iron running transversely from the centre in such manner that the centre comes first in contact, and sloping so as to leave the instant the second beater commences its action.
3rdly. Over this is a concave bed covering one sixth its circumference, made of thin plates of iron, placed between pieces of wood, at a distance of one fourth of an inch, projecting three sixteenths of an inch this rests on the upper side of the frame & is kept down by spiral or other springs - 4thly In front is a fluted Roller 4 inches in diameter to confine the straw and make it feed. 5th Under this is a roller two and a half inches in diameter suspended on springs in such a manner as to give downward one and a half inch. Around this the feeding apron revolves. 6th a wheel three feet three inches in diameter and three inches in thickness is placed on one side of the machine at a distance of three feet from the cylinder on a shaft passing across the machine on which is a cylinder five inches in diameter, round which the apron passes and by means of which it is driven. - 7th Around the wheel passes a band which runs under a pulley on the ~~fluted~~ end of the fluted roller three fourths of the way around a whir two and a half inches in diameter on the cylinder shaft. 8th This wheel is put in motion by cranks or gear or a band wheel by hand, horse, water, or other power. 9th This wheel is armed with teeth on the side toward the machine from the edge inward sixteen inches which with a half circle toothed in like manner suspended on springs against the side of the frame so as to conform to the size of the ear which forms a Corn Sheller.

10th It has a section of one tenth its circumference and 3/4 its thickness which may be reversed at pleasure; one side being armed with teeth and a knife on the other so which with a suitable bar placed across the machine forms a Straw Cutter;

11th About seven inches of the centre of the wheel is left upon which is a plate of cast iron furrowed in such a manner as that with a corresponding plate fastened to the frame with a suitable hopper forms a mill for grinding provender — "What I claim as my invention and improvement is the particular form of the beater and manner of making the concave, driving the feeding roller by the main band, the apron by the main shaft, and the mode of combining the several pieces of machinery Witnesses
John P Boas
Jon^o Slate Benjamin D. Beecher (Patented 20 October 1830)

(612 words)